United States Patent [19]

Lee

[11] 4,062,258
[45] Dec. 13, 1977

[54] FEEDSTOCK CUTTING AND FEEDING DEVICE FOR FORMING MACHINES

[76] Inventor: Yuan Ho Lee, 85, Jen Ho Road, Tainan, China /Taiwan

[21] Appl. No.: 759,907

[22] Filed: Jan. 17, 1977

Related U.S. Application Data

[63] Continuation-in-part of Ser. No. 605,841, Aug. 18, 1975, Pat. No. 4,023,452.

[51] Int. Cl.² .................... B26D 3/16; B26D 7/06
[52] U.S. Cl. ........................................ 83/161; 83/580; 83/588
[58] Field of Search ................ 83/161, 580, 588; 10/13, 25

[56] References Cited

U.S. PATENT DOCUMENTS

| 1,315,963 | 9/1919 | Igou | 83/161 X |
| 2,840,164 | 6/1958 | Rudszinat | 83/161 |
| 2,966,087 | 12/1960 | Gray | 83/580 X |
| 3,082,655 | 3/1963 | Voigt | 83/580 X |
| 3,416,126 | 12/1968 | Calevich et al. | 83/580 X |
| 3,808,930 | 5/1974 | Sieben et al. | 83/580 X |

Primary Examiner—Willie G. Abercrombie
Attorney, Agent, or Firm—Lane, Aitken, Dunner & Ziems

[57] ABSTRACT

A feedstock cutting and feeding device for forming machines having a reciprocating cutter which will cut the feedstock in one, short stroke and hold the cut feedstock in a position to be easily introduced to a transfer disc by the advancement of the feedstock.

4 Claims, 4 Drawing Figures 4,062,258

FEEDSTOCK CUTTING AND FEEDING DEVICE FOR FORMING MACHINES

CROSS REFERENCE TO RELATED APPLICATION

This is a continuation-in-part application of application Ser. No. 605,841, filed Aug. 18, 1975, now U.S. Pat. No. 4,023,452.

BACKGROUND OF THE INVENTION

The present invention relates generally to stock material feeding equipment and, more particularly, to a feedstock cutting and feeding device for forming machines for bolt nuts and similar products.

In conventional bolt and nut forming machines, the several forming dies are arranged in sequence, at equal distances from each other, and in the order of the forming operations, such as the rod-cutting die, the first, second, and third forming dies, and the final pierce punching die. After the feedstock is fed to and positioned from the rod-cutting die a specified length outside the end face of the die, it is cut off by an advancing cutter supported at the front end of a reciprocating rod-cutting shaft, which moves at a right angle to the axis of the rod-cutting die. Simultaneously, the feedstock is cut off by the cutter and forced into a die for punch-forming before it is conveyed to the next die by the rod-cutting shaft. Thereafter, as the rod-cutting shaft moves backwards, the feedstock is ejected from the rear and held between the clamping arm of a transfer clamp to be conveyed to the sequential forming dies by the left and right movement of the clamping arm within the range of 180°.

In this way, after cutting the feedstock, the advancing movement of the rod-cutting shaft must be equal to the distance between two successive forming dies, usually about 60 mm. The distance is very long, and because of the time wasted by this motion, it is impossible to achieve high-speed operation, thus decreasing considerably the efficiency of the forming machine. As a result, a feedstock cutting and forwarding device of complicated structure is required. It is obvious that the conventional device is far from practical.

SUMMARY OF THE INVENTION

An object of the present invention is to resolve the shortcomings mentioned above and to provide a high-speed, feedstock cutting and forwarding device for forming machines, in which the reciprocating stroke of a rod-cutting shaft is only the displacement necessary for the cutter to cut the feedstock rod, with the displacement being measured from the normal position of the cutter at the center of the rod-cutting die. After the cutter has been advanced to cut the rod, it is drawn back to the normal position, and further advancement of rod feed pushes the cut feedstock into a transferring-and-feeding disc. Thus cutting and forwarding are effected without the need to convey the cut feedstock to the first forming die. For example, for a 10 mm rod length, the distance of transfer required between two dies is 60 mm for conventional rod-cutting shafts, whereas the travel distance of the cutter for cutting off a 10 mm rod length according to the present invention is 6 mm, and the rod-cutting shaft achieves this result through only a 6 mm reciprocating movement. Therefore, it takes 1/10 of the stroke needed by the conventional cutter. The rate of production is very high and the mechanism is also quite simple.

BRIEF DESCRIPTION OF THE PREFERRED EMBODIMENTS

Figure 1:
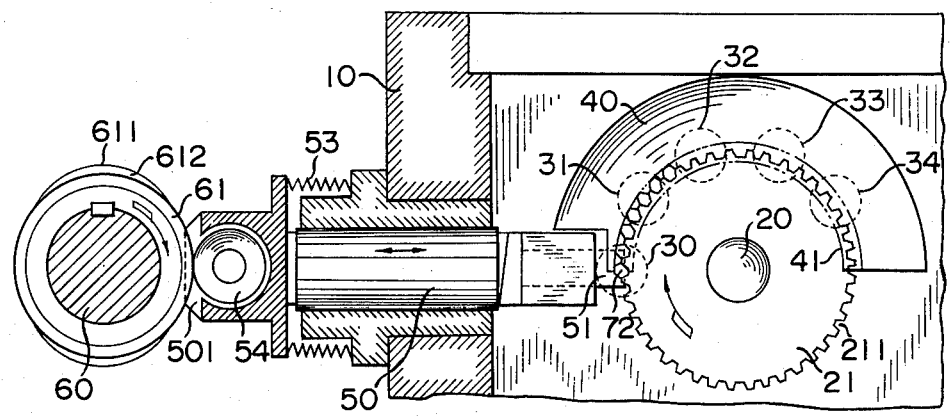
FIG. 1 is a front view, partially in section, of a feedstock cutting and feeding device according to the present invention.

Referring specifically to FIG. 1, an intermittently rotating shaft 20 is fitted on a machine body 10 and a feedstock transferring-and-feeding disc 21 is fixed to the shaft 20. The feedstock receiving portion of the disc 21 is on the periphery thereof, which is on the same circumference as the centers of the dies 30, 31, 32, 33, and 34 (shown in phantom outline). These dies are positioned in the sequence of a forming procedure, such as the forming of a bolt nut with a rod-cutting die and first, second, third, and final piercing dies. The arc of the disc 21 between two successive dies is divided into several equal intervals, and is provided with slots shaped like the external form of one side of the formed products to be received. For example, the slots 211 may have the form of the external shape of one side of a hexagon bolt nut. Spaced from the periphery of the disc 21 is an arc-shaped guide plate 40 which is attached to the machine body 10. The arc-shaped plate 40 encloses a feedstock forwarding device formed by an arc-shaped guide 41. According to the present invention, the rear side position of the transferring-and-feeding disc 21 is adjacent to the feedstock conveyor as mentioned above.

Figure 2:
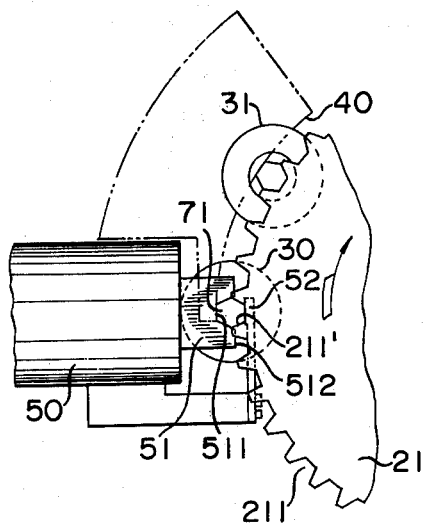
FIG. 2 is an enlarged, partial front view of a cutter according to the present invention.

The front end of a rod-cutting shaft 50 is fitted with a cutter 51. In the embodiment of the cutter shown in FIG. 2, the front part 512 of the cutter is provided with a slot 511 shaped as the external form of one side of the formed material. The normal position of the cutter 51 is with the front edge 512 of the cutter adjacent to the vertical centerline of the rod-cutting die 30, with the contour of the slot 511 substantially parallel with the contour of the rod-cutting die, so that in cooperation with one of the slots 211' on the disc 21 an aperture which has the shape of the outline of the body to be formed is formed by the aligned cut-off die 30, the cutter 51, and the slot 211' of the disc 21. After the cutter slot 511 receives the formed material, a pressure contact spring strip 52 comes into contact with the external side surface of the formed material for tight holding to prevent the dropping of the formed material.

Figure 3:
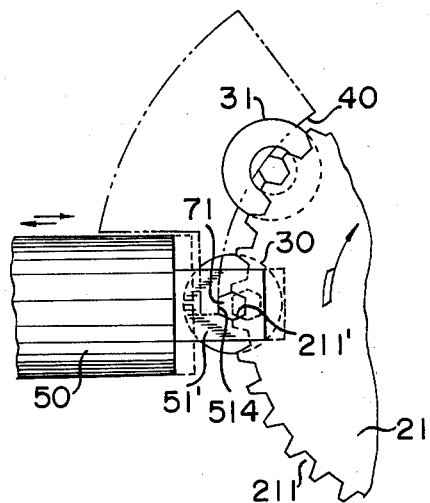
FIG. 3 is a view similar to FIG. 2, but showing an alternate embodiment of the cutter.

Shown in FIG. 3 is an alternate embodiment of the rod-cutting shaft 50 which obviates the need for the pressure contact spring 52. The cutter 51' is provided with a straight, front surface 513, and an aperture 514 having a contour in the shape of the external configuration of the feedstock in disposed on the cutter, adjacent to the front surface. The normal, pre-cutting position of the cutter is shown in solid lines, with the aperture 514 axially aligned, i.e., perpendicularly aligned relative to the plane of FIG. 3, with the feedstock-receiving opening in the cut-off die 30 and the slot 211' on the transferring-and-feeding disc 21. The post-cutting position of the cutter 51' is shown in dotted lines, from which position the cutter returns to the pre-cutting position as a result of the reciprocal motion of the rod-cutting shaft 50 (as indicated by the arrows) due to the combined action of the biasing spring 53 and the cam 61. After being cut, the feedstock blank is retained within the aperture 514 and is thus returned by the reciprocating shaft 50 to a position where advancement of the feedstock will feed the cut blank to the disc 21.

Figure 4:
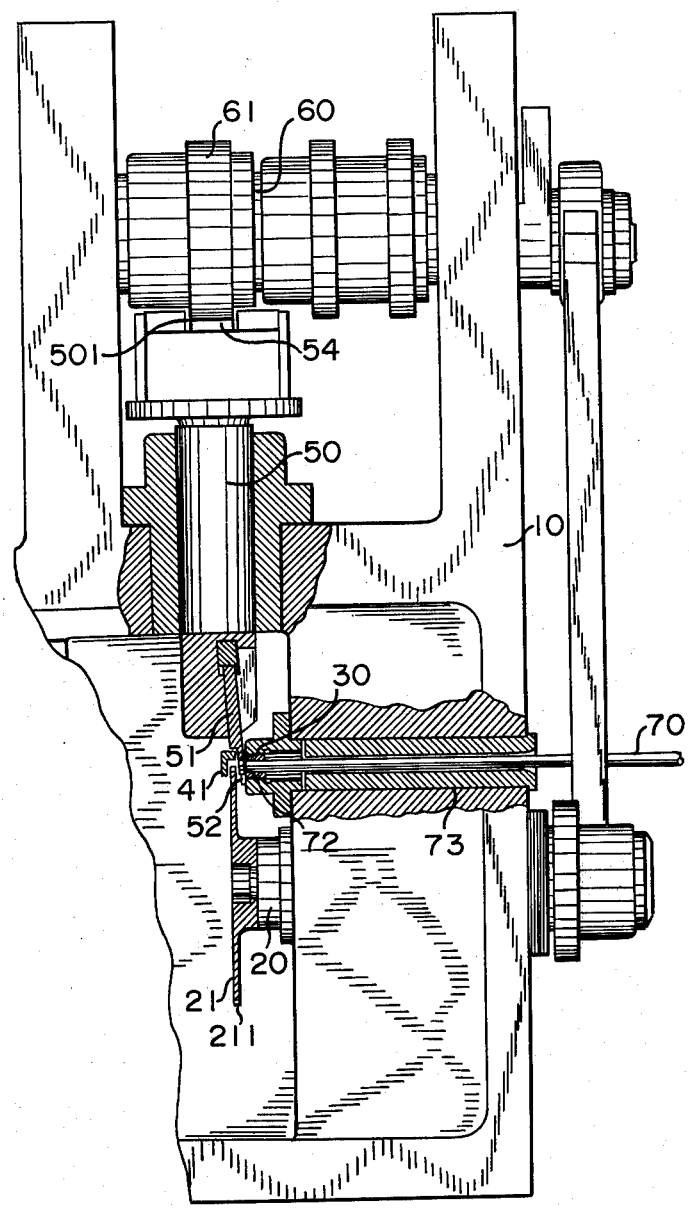
FIG. 4 is a plan view, partially in section, of a feedstock cutting and feeding device according to the present invention.

As can be seen from FIGS. 1 and 4, the back end of the rod-cutting shaft (to be left in FIG. 1) is provided with an opening 501 to receive a cam 61 and a roller 54 which is pivotally supported by a bearing. The cam 61 is fixed to a transmission shaft 60 in a position of corresponding contact with the roller 54 under the biasing influence of a spring 53 disposed around the rod-cutting shaft 50.

After a rod material 70 is fed through a guide 73 by a feeding roll (not shown in the drawings), through the rod-cutting die 30 and extends from the end face of the die 30 to a specified length (FIG. 4), the rod-cutting shaft 50 is driven by the transmission shaft 60, which rotates the cam 61 engaged with the roller 54. The operating height 611 of the cam is set at the stroke distance required by the cutter 51 to cut off the rod material, e.g., for a length of 10 mm, it is set at 6 mm. Driven by the roller 54, the rod-cutting shaft 50 advances the cutter 51 through its operating distance relative to the cutting die 30 and cuts off the rod material 70 to form a blank or feedstock 72. The feedstock 72 is tightly held against the slot 511 of the cutter 51. The spring 53, compressed during the forward stroke of the shaft 50, returns the cutter 51 to its original position. Due to the feeding and advancement of the rod material 70, the blank 72 held by the cutter 51 is pushed into the slot 211' of the transferring-and-feeding disc 21. The blank 72 is then conveyed in the direction indicated by the arrow in FIGS. 1 and 2, into position with the successive dies 31-34 by the intermittent rotation of the transferring-and-feeding disc 21. The operation of the device with the cutter 51' shown in FIG. 3 is identical.

What is claimed is:

1. A high-speed feedstock cutting and forwarding device for use with a bolt nut forming machine comprising:

a cutter for cutting feedstock, said cutter having an aperture in the configuration of the external shape of the product to be formed for receiving and holding the feedstock;

means for driving said cutter in a reciprocal manner;

means for returning said cutter and resultant cut nut blank to the normal position of said cutter after the feedstock has been cut;

a transferring and conveying disc structurally adapted and provided at a suitable position in relationship to said cutter for receiving nut blanks cut thereby and for conveying cut nut blanks away from the cutter; and driving means operatively connected to said disc to drive said disc in a rotary motion, said device being characterized in that the cutter is driven through a moving distance by said cutter driving means only about one half of the distance through the feedstock to achieve cutting thereof, and said return means returns said cutter and resultant nut blank the same distance to a suitable position for introduction of the resultant nut blank to said disc.

2. A device as set forth in claim 1 wherein said cutter comprises a blade and said aperture is disposed on said blade adjacent to one edge of said blade.

3. A device as set forth in claim 2 wherein said means for driving said cutter includes a shaft supporting said blade on one end thereof, a roller operatively connected to the other end of said shaft, and a driven cam cooperating with the roller for driving said shaft in a reciprocal manner through a suitable distance.

4. A device as set forth in claim 3 wherein said return means comprises a spring disposed about said shaft.

* * * * *